Figure 1:
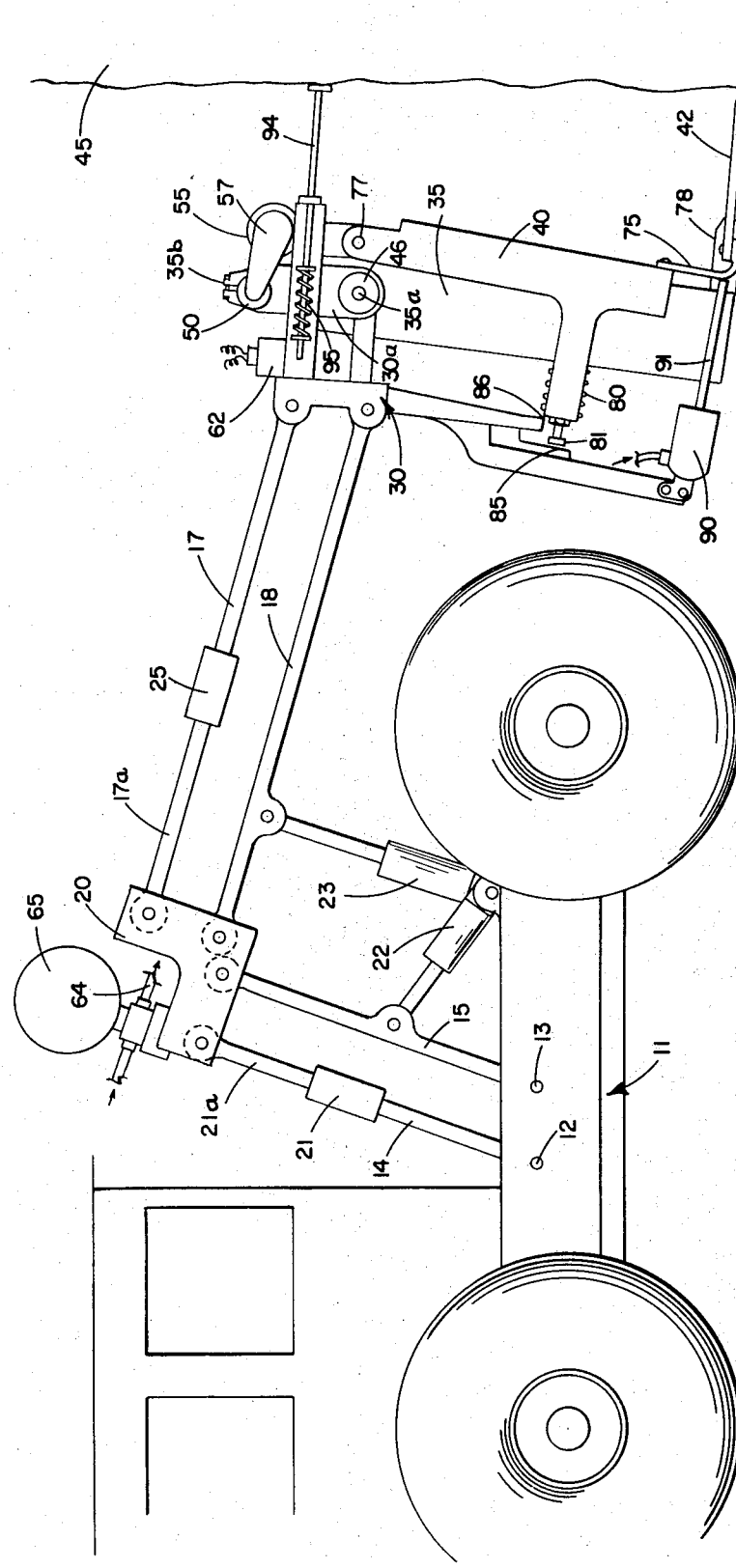

United States Patent [19]
Bodine

[11] 3,774,659
[45] Nov. 27, 1973

[54] SONIC TIMBER CUTTING APPARATUS

[76] Inventor: Albert G. Bodine, 7877 Woodley Ave., Van Nuys, Calif. 91406

[22] Filed: July 20, 1972

[21] Appl. No.: 273,496

Related U.S. Application Data

[63] Continuation-in-part of Ser. No. 124,349, March 15, 1971, Pat. No. 3,688,824.

[52] U.S. Cl. ............................ 144/34 R, 144/34 A
[51] Int. Cl. ......................................... A01g 23/08
[58] Field of Search ................... 144/34 R, 309 AC

[56] References Cited
UNITED STATES PATENTS
2,474,037  6/1949  Cuthrell ........................... 144/34 A

*Primary Examiner*—Gerald A. Dost
*Attorney*—Edward A. Sokolski

[57] ABSTRACT

Sonic energy is coupled from an orbiting mass oscillator to a drive member. Unidirectional pulses of vibrational energy are coupled from the drive member through an acoustical rectifier to a cutter blade, the blade being biased against timber to be cut. The vibrational energy imparted to the cutter blade thus efficiently implements the cutting action.

3 Claims, 7 Drawing Figures

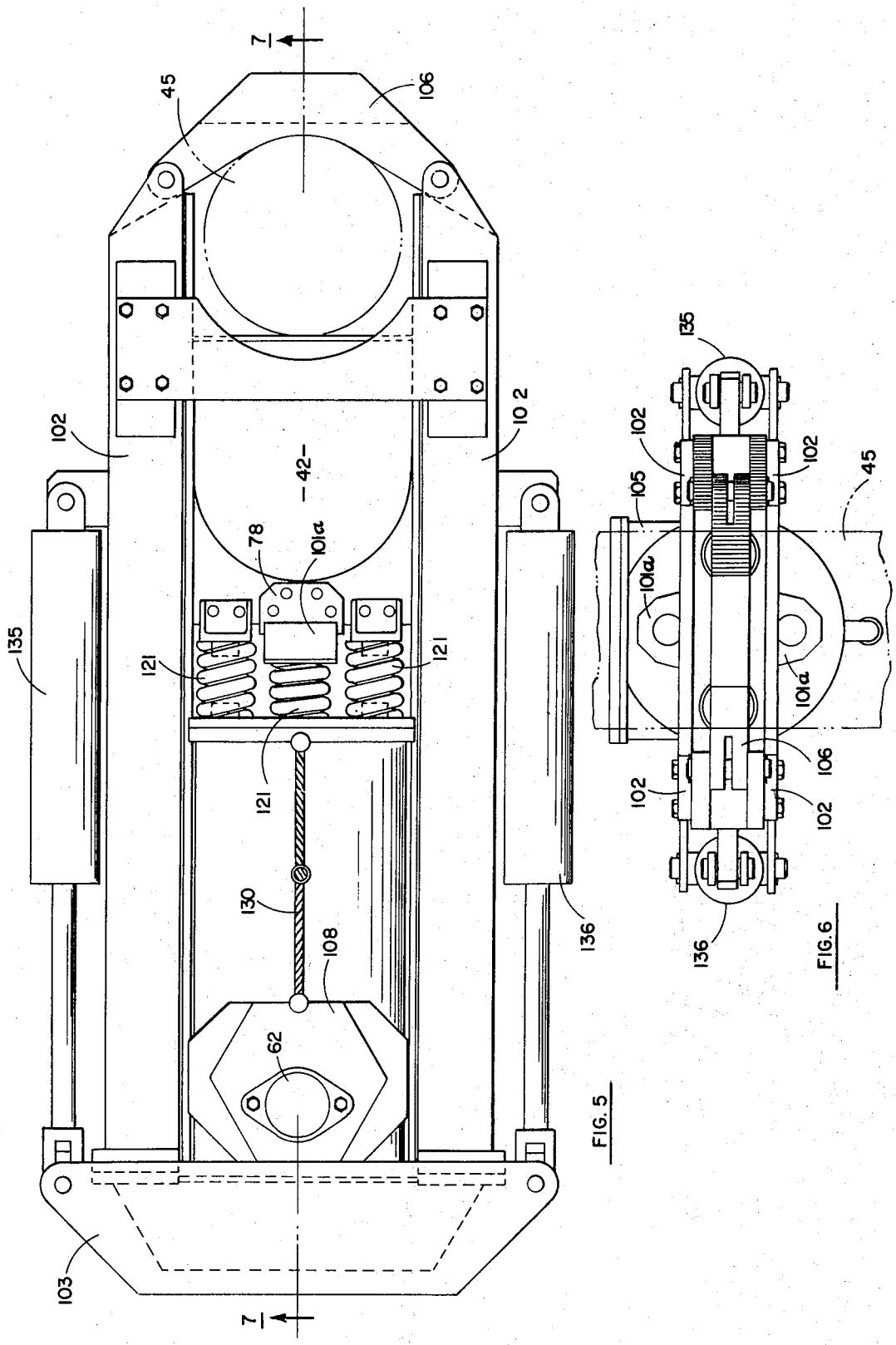

SONIC TIMBER CUTTING APPARATUS

This application is a continuation-in-part of my application Ser. No. 124,349 filed Mar. 15, 1971, and now U.S. Pat. No. 3,688,824.

This invention relates to an apparatus for cutting standing timber and more particularly to such an apparatus in which sonic energy is utilized to implement the cutting action.

A commonly used technique for cutting standing timber involves the use of a motor driven chain saw which is mechanically driven in reciprocal fashion to provide the cutting action. While certain chain saws are relatively efficient in their operation, they have a shortcoming in that it is impossible to cut the trees very close to the ground. This is in view of the fact that due to the drive mechanism structure, it is difficult to position the cutting blade very close to the ground surface; further, it is undesirable to get the blade too close to the ground where it might drag along the ground surface such as to damage the blade teeth. Thus, in using a chain saw, tree stumps which rise a significant distance above the ground surface are left remaining. This not only is a waste of timber but also makes for an unsightly and bothersome stumped area which is an obstacle course to vehicles that may be used in the lumbering operation. Later, when the land is to be used for other purposes, such as farming or as a construction site, the stumps must be uprooted or burned out. Further, with cutting such as implemented with a chain saw, the wood fibers often tend to compress together offering considerable resistance to the cutting operation. This could be alleviated if means were available to separate the fibers from each other so that they would present less resistance to the cutting edge.

Hydraulically driven paired shearing blades are also utilized in cutting timber. As for the chain saw, with this type of device it is difficult or impossible to cut a tree close to the ground level. Further, with this type of hydraulically driven blade, it is difficult or impossible to cut hard or frozen wood. Also, with this type of paired blade operation, the opposing blades finish their cutting in the center of the tree, with the tree falling over in such a manner that it often rips the last bit of wood apart, resulting in damage to the end of the log.

In my application Ser. No. 124,349 of which the present application is a continuation-in-part, the use of a resonant vibration system in implementing this invention is described. It has been found that in certain situations such as in cutting very hard wood and where a less bulky and more economical unit is essential, it may be desirable to utilize the device of the present invention which does not make use of a resonant system.

The technique and apparatus of this invention overcomes the aforementioned shortcomings of the prior art by utilizing sonic energy for implementing the cutting action. In view of the fact that conventional cutting blade and drive equipment is not needed, it is feasible to bring the cutting blade right to the ground level of the tree trunk so that a cut can be made flush with the ground surface so that stumps are not left standing. Further, the vibratory sonic energy tends to separate the fibers of the wood from each other, which greatly facilitates the cutting action. Still further, it is possible to efficiently cut the timber with a single cutting blade which enters the trunk from only a single side thereof, this in view of the high relative motion attained between the vibratory blade and the high mass provided by the tree trunk, such interaction being possible without the need for applying any significant amount of bias force against the blade. There also is no need for a high mass support and drive member for the blade in view of the fact that the drive force is developed by the vibratory energy and need not depend on the conventional type of mechanical driving force.

The vibratory drive of this invention is very effective in cutting hard or frozen wood, the cells of which are frangible to vibratory energy and to which the vibratory drive source can be efficiently impedance matched. It is further to be noted that the sonic drive system of this invention is preferably utilized in such a manner that the force for the cutting action is provided in vibratory pulses such that the blade is effectively disengaged on each vibration cycle, releasing the fibers momentarily, thus preventing them from bunching up and rather engendering their separation. The cutting action thus tends to act on the individual fibers of the wood, making for efficient and clean cutting action right on to the very finish of the cut. This not only greatly facilitates the cutting operation but also minimizes damage to the timber.

It is therefore an object of this invention to facilitate the harvesting of timber.

It is a further object of this invention to enable the cutting of timber right at the ground level so as to avoid leaving stumps.

It is still another object of this invention to provide a more efficient technique for cutting timber by utilizing sonic energy for implementing the cutting action.

It is still a further object of this invention to provide a more efficient technique and apparatus for cutting hard or frozen timber.

Figure 2:
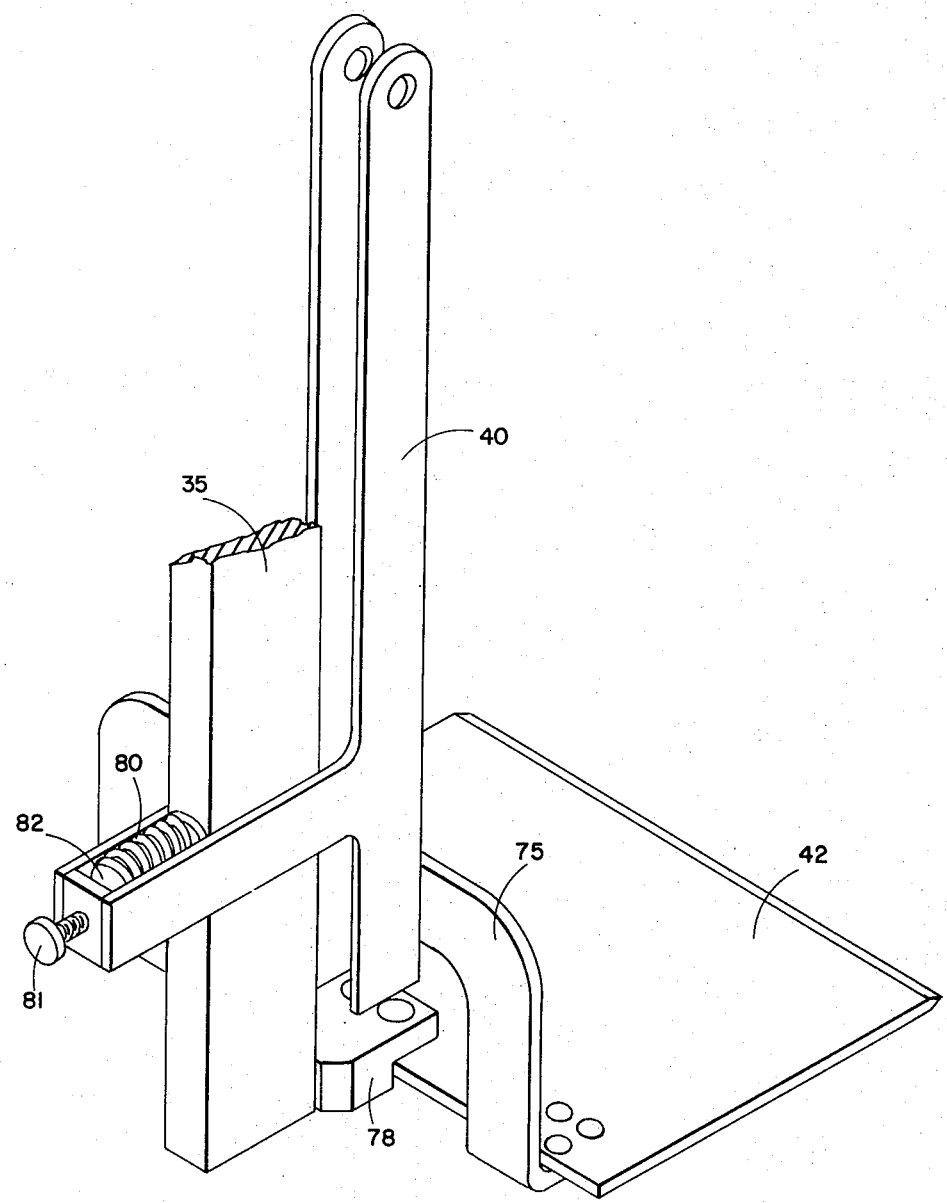
Figure 3:
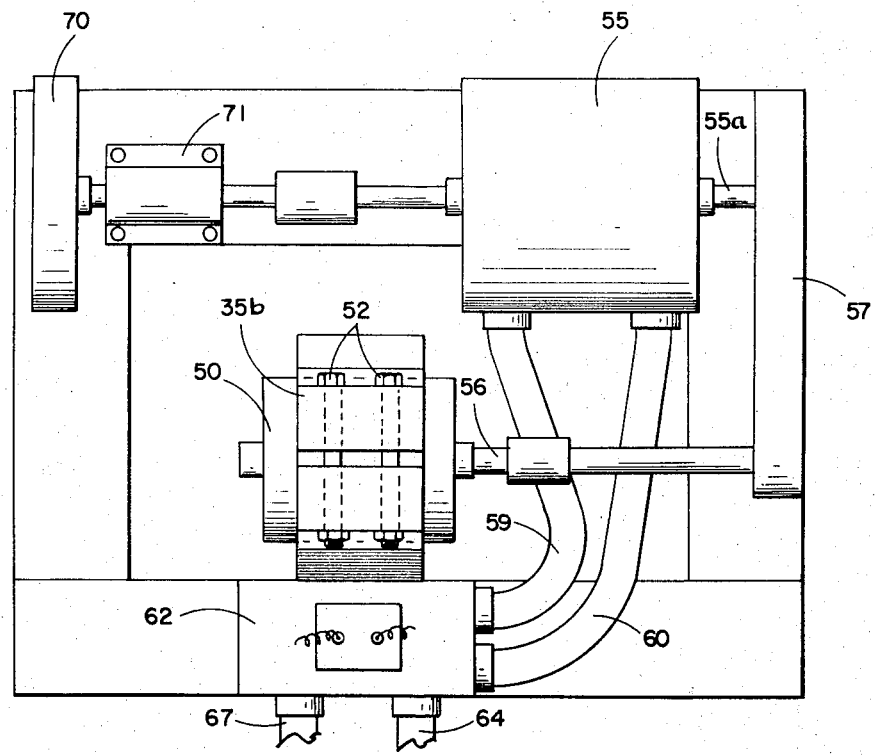
Figure 4:
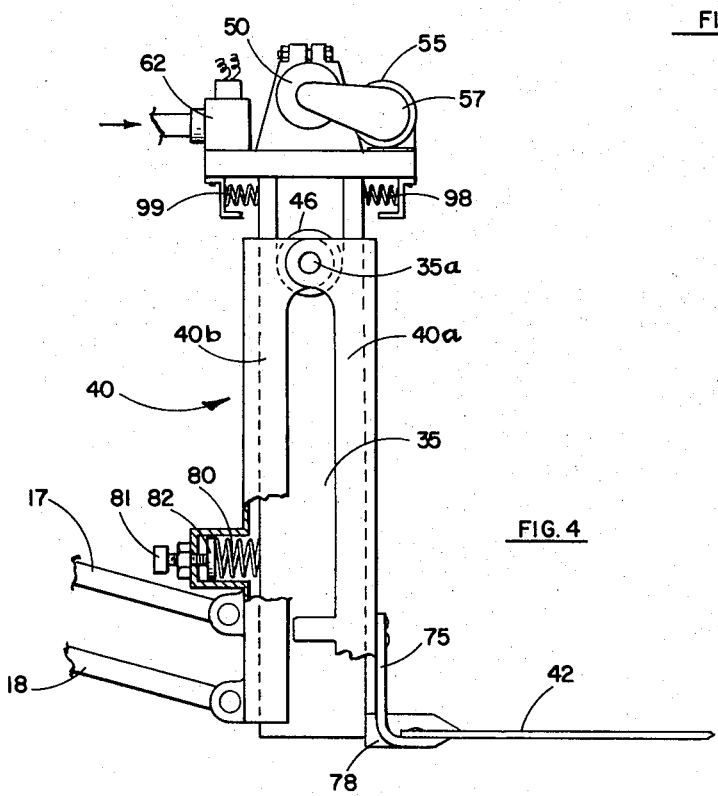
Figure 7:
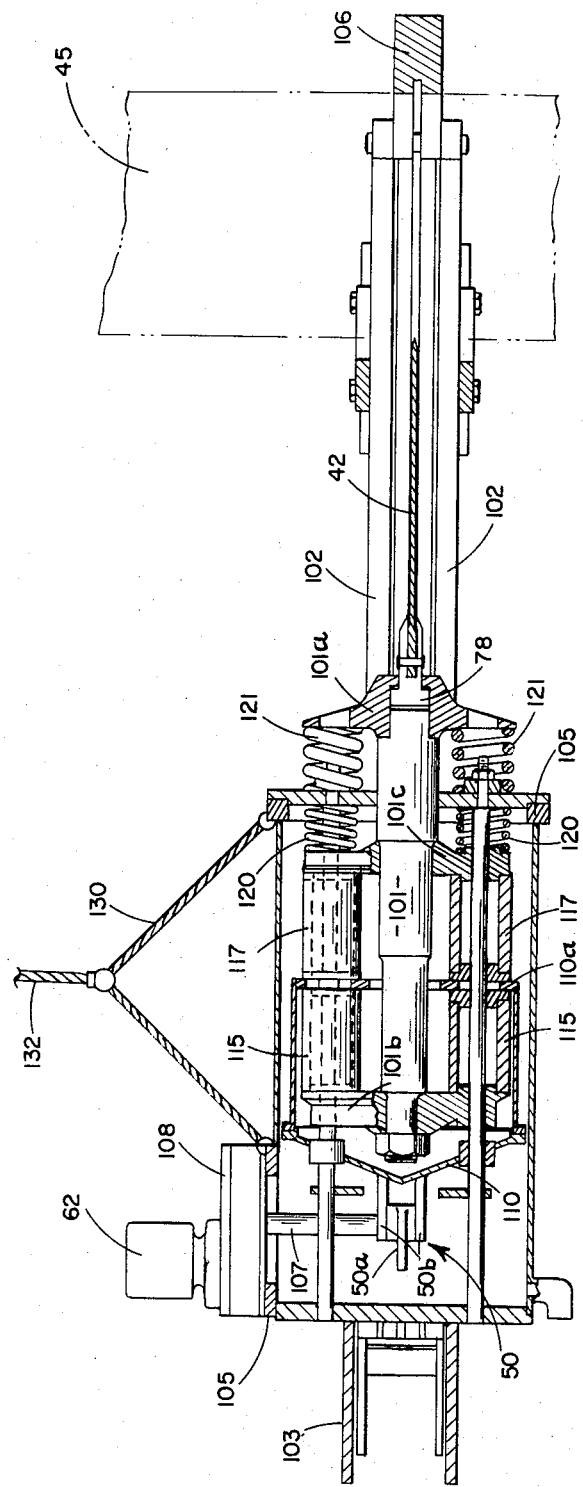

Other objects of this invention will become apparent as the description proceeds in connection with the accompanying drawings, of which:

FIG. 1 is a side elevational view of a first embodiment of the invention,

FIG. 2 is a perspective view illustrating the cutting blade and the drive therefor of the embodiment of FIG. 1, FIG. 3 is a top plan view of the embodiment of FIG. 1, FIG. 4 is a side elevational view of an alternative drive structure which may be utilized in the embodiment of FIG. 1, FIG. 5 is a top plan view of a second embodiment of the device of the invention, FIG. 6 is an end elevational view of the embodiment of FIG. 5, and FIG. 7 is a cross-sectional view taken along the plane indicated by 7—7 in FIG. 5.

Briefly described, the technique and apparatus of the invention are as follows:

Vibratory energy at a sonic frequency is generated by means of an orbiting mass oscillator, the output of which is coupled to a drive member which may comprise a bar member or the like. Vibratory energy is coupled from the bar member to a cutter blade which engages the timber to be cut. A mechanical rectifier is interposed between the blade and the timber so as to convert the energy into unidirectional vibrational pulses. The rectifier action is implemented by means of resilient bias means which may be in the form of a bias spring which resiliently urges the blade against the timber. The bias spring is adjusted so that on the vibratory excursions away from the tree trunk, the blade will disengage itself from the timber but will be driven sharply against the timber in a pulsating manner during the vibratory excursions towards the tree trunk. The cutting blade thus will be driven in a vibratory pulsating manner against the tree trunk. In facilitating the alignment of the cutter blade with the tree, an alignment frame may be utilized so that the trunk can be cut right flush with the surface of the ground to avoid any standing stumps whatsoever.

Referring now to FIGS. 1–3, a first embodiment of the device of the invention is illustrated. Mounted on vehicle 11 for rotatable motion about pivot points 12 and 13 are support bars 14 and 15. A pair of articulated boom members 17 and 18 are pivotally supported on frame member 20, this frame member being pivotally supported on bar 15 and the shaft 21a of hydraulic cylinder 21. Hydraulic cylinders 22 and 23 are pivotally supported on vehicle 11 and their drive shafts pivotally attached to bar 15 and boom 18 respectively. Boom 17 has a hydraulic cylinder 25 incorporated therein, the drive shaft of cylinder 25 being attached to or integrally formed with arm portion 17a of the boom. Booms 17 and 18 are pivotally connected to frame 30 from which the drive bar 35 and the support structure 40 for cutting blade 42 is suspended. It thus can be seen by adjusting the various hydraulic cylinders that the blade 42 can be placed in the desired cutting position against the trunk of a tree 45 to be cut. As indicated in FIG. 1, this cutting position is flush with the surface of the ground with the blade being slightly downwardly angulated so as to cut through the trunk at a downward angle running slightly below the surface.

Bar member 35 is supported on support structure 30 on a pair of pins 35a which extend outwardly therefrom and are seated in rubber bushings 46, these rubber bushings being fitted into apertures formed in arm portions 30a which extend from the support structure 30. Bar member 35 has a bifurcated top end portion 35b which has an aperture therein in which orbiting mass oscillator 50 is fitted. The oscillator casing is held in tight engagement with bar member 35 by means of bolts 52 which fit through the forked end portion 35b of the bar and are tightened to provide the desired clamping action.

Oscillator 50 may be an orbiting mass oscillator of the type described in my U.S. Pat. No. 3,402,612, having a cylindrical rotor which rolls around a raceway formed in the oscillator housing. When the rotor is rotatably driven at a sonic frequency, vibratory energy at the frequency of rotation is developed in the casing thereof, this energy being transferred to bar 35. Referring particularly to FIG. 3, the rotor of oscillator 50 is rotatably driven by means of hydraulic motor 55, the output shaft 55a of which is coupled to the rotor drive shaft 56 by means of drive coupling 57 which may include a gear train or a drive band. Motor 55 is rotatably driven by means of hydraulic power supplied through lines 59 and 60, the power in these lines being controlled by means of hydraulic valve 62. Valve 62 may be electrically controlled and receives input drive on line 64 from an appropriate hydraulic source (not shown). Return flow for the hydraulic drive is handled by line 67. An accumulator 65 is provided for the hydraulic system. Hydraulic motor 55 has a flywheel 70 attached to its drive shaft, rotatable support for the flywheel shaft being provided by means of bearing member 71.

As can best be seen in FIG. 2, cutter blade 42 has a resilient bracket member 75 fixedly attached thereto, bracket member 75 in turn being fixedly attached to support member 40. Support member 40 is pivotally supported on support frame 30 by means of pivot pin 77. An "anvil" member 78 is fixedly attached to blade 42 along the rear edge thereof.

Bar member 35 which is of a relatively rigid material and as already noted, is pivotally supported on support structure 30 in bushings 46 by means of pin 35a, is resiliently urged against anvil member 78 by means of spring 80. The urging action of spring 80 against bar member 35 is adjusted by means of thumb screw 81, which has a plate member 82 attached thereto which controls the compression of the spring.

Oscillator 50 is driven by motor 55 such as to set up bodily lateral vibration of bar member 35, i.e. transverse to the longitudinal axis of the bar member towards and away from anvil member 78. Thumb screw 81 should be adjusted to provide optimum rectifier action at the interface between bar member 35 and anvil 78. That is to say, vibrational energy should be transmitted to anvil 78 in a series of unidirectional pulses during the vibrational excursions of the bar towards the anvil. On the vibrational excursions away from the anvil, bar member 35 should separate slightly therefrom, acting during this excursion against the resilient action of spring 80. Thus, pulsating energy is transmitted from bar member 35 to cutter blade 42 to implement the cutting action.

To get the blade 42 started into the tree, forcing action may be provided by means of hydraulic cylinder 90, the drive shaft 91 of which is positioned to be driven against the rear of bracket 75. Further action in implementing the starting of the cutting operation can be provided by suitably actuating booms 17 and 18 to cause surfaces 85 and 86 to abut against the head of screw 81 and the back edge of support member 40 respectively. Alignment rod 94 which is resiliently urged forward by means of spring 95 may be used to facilitate the alignment of the device with the tree.

Referring now to FIG. 4, a variation of the bar and associated drive assembly for the cutter blade is illustrated. As can be seen in this variation, the articulated booms 17 and 18 are attached to the bottom portion of bracket assembly 40. Bracket 40 has two arm portions 40a and 40b which are pivotally joined together on resilient bushings 46, which may be of rubber. As for the first embodiment, bar member 35 has a pair of pins 35a which extend therefrom which are seated in bushings 46. Bar member 35 is resiliently centered by means of centering springs 98 and 99. As for the first embodiment, bar member 35 is resiliently urged against the anvil 78 of the cutter blade 42 by means of spring 80 which is adjusted with thumb screw 81.

Referring now to FIGS. 5–7, another embodiment of the device of the invention is illustrated. Cutter blade 42 has an anvil 78 fixedly attached to the rear edge thereof, this anvil being slidably retained in head portion 101a of drive rod 101. Two pairs of bars 102 extend from bracket 103 to provide supports for detachable holder member 105 which extends across the tree trunk opposite the blade and is used for placing and holding the blade in position against the tree trunk 45 to be cut.

Orbiting mass oscillator 50 has an eccentric rotor member 50a which is mounted for rotation on bearings formed in brackets 50b. Rotor 50a is rotatably driven by means of motor 62 which is supported on casing 105 and is connected to drive shaft 107 through gear train 108. Drive shaft 107 is coupled to rotor 50a by means of a universal joint (not shown). The bearing brackets 50b of oscillator 50 are connected to a support frame 110. Drive member 101 has a pair of oppositely positioned flanges 101b and 101c fixedly attached thereto. A first set of rigid tubes 115 are retained between flange 101b and the end wall portion 110a of oscillator attached frame 110, while a second set of rigid tubes 117 are retained between the opposite side of wall 110a and flange 101c. Tubes 115 and 117 provide rigid coupling between the oscillator and drive member 101. Thus, when rotor 50a of oscillator 50 is rotated by means of motor 62 frame 110 is vibratorily driven causing drive member 101 to be vibratorily driven along its longitudinal axis at the vibration frequency. Centering springs 120 and 121 are provided between casing 105 and flange 101c and the casing and head portion 101a respectively. These springs are used to keep the vibration system in a desired average position for optimum coupling of the vibratory energy between drive member 101 and anvil 78.

With oscillator 50 operating unidirectional pulses of vibrational energy are provided from drive member 101 to cutter blade 42 in the same manner as described for the first embodiment, with the end of drive member 101 driving against anvil 78 during the vibratory excursion towards the anvil and separating from the anvil during at least a portion of the vibratory excursion in the opposite direction, rectifier action thus being provided between the drive member and the anvil.

The device may be supported from a vehicle or other support mechanism such as a hoist by means of lines 130 which are attached to support frame 105 and which have a lift cable 132 attached thereto. Hydraulic cylinders 135 and 136 which are connected between housing 105 and the cutter blade may be utilized to provide a bias driving force in getting the blade started into the timber, at the start of the cutting action.

While the invention has been described and illustrated in detail, it is to be clearly understood that this is intended by way of illustration and example only and is not to be taken by way of limitation, the spirit and scope of this invention being limited only by the terms of the following claims.

I claim:

1. Apparatus for cutting standing timber comprising:
   a cutter blade,
   means for unidirectionally biasing said cutter blade against the timber to be cut,
   an orbiting mass oscillator,
   a substantially rigid member coupled to said orbiting mass oscillator to transmit the vibrational output thereof,
   means for driving said orbiting mass oscillator at a frequency which develops periodic force such as to cause bodily vibration of said rigid member, and
   sonic rectifier means for coupling unidirectional pulses of vibrational energy from said rigid member to said cutter blade, said rectifier means including said biasing means, whereby the blade member receives drive impulses from the rigid member during a portion of the vibratory cycles and is disengaged from said rigid member during another portion of said cycles.

2. The device of claim 1 and further including an anvil member attached to said blade member, said rigid member being resiliently urged by said biasing means against said anvil member, a gap being formed between said rigid member and said anvil member during the aforementioned disengaged portion of the vibration cycle.

3. The device of claim 1 and further including articulated support means for said blade member, and means for driving said articulated support means to position said blade member along two mutually orthogonal axes.

* * * * *